UNITED STATES PATENT OFFICE.

CYRUS E. PEIRCE, OF McPHERSON, KANSAS.

IMPROVEMENT IN COMPOUNDS FOR ARTIFICIAL STONE.

Specification forming part of Letters Patent No. 191,999, dated June 12, 1877; application filed February 20, 1877.

*To all whom it may concern:*

Be it known that I, CYRUS E. PEIRCE, of McPherson, in the county of McPherson and State of Kansas, have invented a new and useful Compound for the Manufacture of Artificial Stone, which compound is fully described in the following specification:

The nature of my invention relates to a new and useful composition of sand, cement, and lime, cemented with certain chemicals for the production of an artificial stone by the process hereinafter set forth.

In the preparation of twenty gallons of my compound, I take, of copperas, four pounds; sulphuric acid, three-fourths of a pound; sodæ silicas, (or marble dust,) five pounds; glue, one pound; carbonate potassa, three pounds; common molasses, one-half gallon. Dissolve the glue in two gallons of soft water, heating it slowly up to the boiling point; then add the potassa and molasses, and boil for ten minutes.

I then add the copperas, sulphuric acid, marble-dust, (or sodæ silicas,) and enough water to make up the twenty gallons.

With the above-described compound I slake my lime and add one part of so slaked lime to five or more parts of sand, according to its fineness, and one part of cement moistened with the said compound to the consistency of molder's sand, and press into molds to give the required configuration.

What I claim as my invention is—

The artificial stone described, consisting of glue, potassa, molasses, copperas, sulphuric acid, marble-dust, lime, cement, and water, prepared and compounded in about the manner and proportions described.

CYRUS E. PEIRCE.

Witnesses:
R. M. CLARK,
R. W. BULL.